(No Model.)
H. L. AYER.
TAG HOLDER FOR COTTON BALES.
No. 292,196. Patented Jan. 22, 1884.
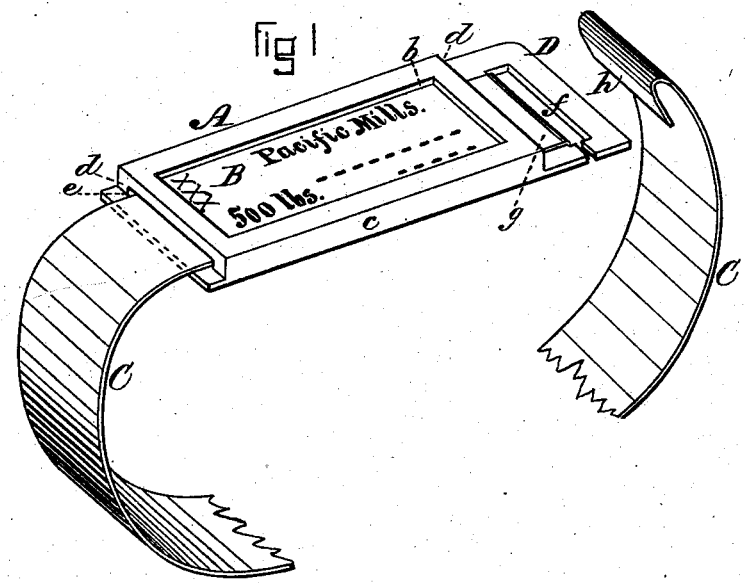
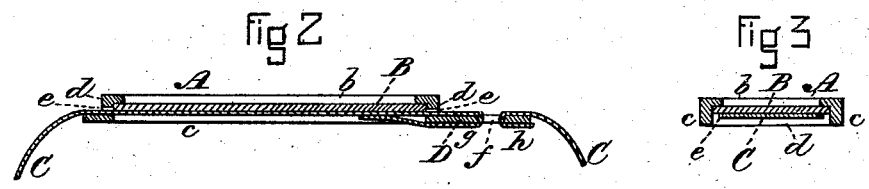
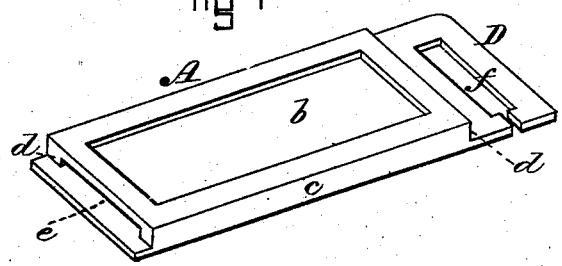
WITNESSES
W. J. Cambridge
Chas. E. Griffin
INVENTOR
Henry L. Ayer

UNITED STATES PATENT OFFICE.

HENRY L. AYER, OF EAST WILTON, MAINE, ASSIGNOR TO HIMSELF AND ALTON E. AYER, OF BOSTON, MASSACHUSETTS.

TAG-HOLDER FOR COTTON-BALES.

SPECIFICATION forming part of Letters Patent No. 292,196, dated January 22, 1884.

Application filed July 18, 1883. (No model.)

*To all whom it may concern:*

Be it known that I, HENRY L. AYER, a citizen of the United States, residing at East Wilton, in the county of Franklin and State of Maine, have invented certain Improvements in Tag-Holders for Cotton-Bales and other Baled Goods, of which the following is a full, clear, and exact description, reference being had to the accompanying drawings, making part of this specification, in which—

Figure 1 is a perspective view of my improved tag-holder applied to a sheet-metal bale-hoop, and having a descriptive tag or card placed therein. Fig. 2 is a longitudinal vertical section through the center of the same. Fig. 3 is a transverse vertical section through the same. Fig. 4 is a view of the tag-holder detached from the bale-hoop.

My invention relates particularly to tag-holders which are designed to be applied to the sheet-metal hoops of cotton-bales and other baled goods, thus forming a simple and convenient device for securely attaching to a bale of cotton or other goods a descriptive tag or card to indicate its destination, weight, &c.; and my invention consists in an open metallic plate or frame provided on its under surface at the sides and ends with downwardly-projecting flanges, within which is placed the tag or card, the upper surface of which is displayed through the opening in the plate, each of the end flanges being provided with a slot below the level of the under side of the plate for the passage of the bale-hoop, which lies beneath the tag or card, and thus securely confines it in place within the recess formed by the flanges on the under side of the plate, an exceedingly simple and durable tag-holder, not liable to be broken or injured by hard usage, being thus provided.

My invention also consists in a tag-holder constructed as above described, and provided at one end with an extension having a transverse slot, over the sides of which are hooked the opposite ends of the bale-hoop, which is thus fastened around the bale of goods in a simple and effective manner without the employement of any other locking device.

In the said drawings, A represents my improved tag-holder, which is preferably composed of malleable iron, and consists of a plate of suitable thickness and strength provided with a rectangular opening, $b$. Projecting down from the under surface of the plate A, at right angles thereto and at the sides and ends thereof, are flanges $c\ c\ d\ d$, which thus form a recess for inclosing or surrounding a descriptive tag or card, B, bearing on its face the destination, weight, &c, of the bale of cotton or other goods to which it is applied, the face of the tag or card being exposed to view through the opening $b$ in the plate A. Each of the end flanges, $d\ d$, is provided, a short distance below the level of the under side of the plate A, with a transverse slot, $e$, through which, after the tag or card B is in place, is passed the sheet-metal bale-hoop C, which extends longitudinally from one end of the holder to the other beneath the under side of the tag or card B, and thus securely confines the latter within the recess formed by the flanges $c\ c\ d\ d$ on the under side of the plate, and effectually prevents it from becoming displaced and lost, which is an important consideration. At one end of the plate A is an extension, D, which lies in a plane parallel with the plate A, and on a level with the bottoms of the slots $e$, this extension being provided with a transverse slot, $f$, over one side of which is hooked the turned-over portion $g$ at one end of the hoop C. The hoop is then passed around the bale of cotton or other merchandise and its opposite bent-over end, $h$, hooked over the opposite side of the slot $f$, when the hoop, with its tag-holder, will be securely fastened around the bale as required, and the tag or card B at the same time securely confined within its holder A by the passage thereunder of the hoop C, as before described. If preferred, however, the extension D, with its slot $f$, may be dispensed with, in which case the hoop C, after being passed through the slots $e\ e$ of the plate A, would be secured in place around the bale by means of any suitable tie or fastening device, the plate or holder, with the tag or card B, being slid along the hoop, to bring it into any desired position on the bale before the ends of the hoop are secured together.

What I claim as my invention, and desire to secure by Letters Patent, is—

1. The within-described metallic holder for tags, cards, &c., consisting of a plate, A, having an opening, $b$, and provided on its under surface with downwardly-projecting side flanges, $c\ c$, and end flanges, $d\ d$, the latter having slots $e\ e$ for the passage of the bale-hoop, which is adapted to pass beneath the tag or card and confine it within the recess formed by the flanges $c\ c\ d\ d$, substantially as set forth.

2. The plate or holder A, having an opening, $b$, and provided on its under side with downwardly-projecting side flanges, $c\ c$, and end flanges, $d\ d$, having slots $e\ e$, in combination with the bale-hoop C, adapted to pass through the slots $e\ e$ and extend from one end of the holder to the other beneath the tag or card, to confine the latter within the recess in the under side of the plate A, formed by the flanges $c\ c\ d\ d$, all constructed to operate substantially in the manner and for the purpose set forth.

3. The plate or holder A, having an opening, $b$, and downwardly-projecting side flanges, $c\ c$, and end flanges, $d\ d$, having slots $e\ e$, and provided with an extension, D, having a transverse slot, $f$, substantially as and for the purpose described.

Witness my hand this 5th day of July, A. D. 1883.

HENRY L. AYER.

In presence of—
P. E. TESCHEMACHER,
W. J. CAMBRIDGE.